Oct. 11, 1932. F. W. HENKE, JR  1,881,566
SPARE TIRE AND WHEEL LOCK
Filed March 1, 1932

Inventor
Frederick W. Henke Jr.
By Barker & Collings
Attorneys

Patented Oct. 11, 1932

1,881,566

UNITED STATES PATENT OFFICE

FREDERICK W. HENKE, JR., OF PHILADELPHIA, PENNSYLVANIA, ASSIGNOR TO FOX AUTOMOTIVE PRODUCTS CORPORATION, OF PHILADELPHIA, PENNSYLVANIA, A CORPORATION OF DELAWARE

SPARE TIRE AND WHEEL LOCK

Application filed March 1, 1932. Serial No. 596,099.

This invention relates to tire and spare wheel locks of the tire-encircling-band type. It has for its object to improve locks of this kind in the particulars to be hereinafter pointed out and claimed.

Figure 1:
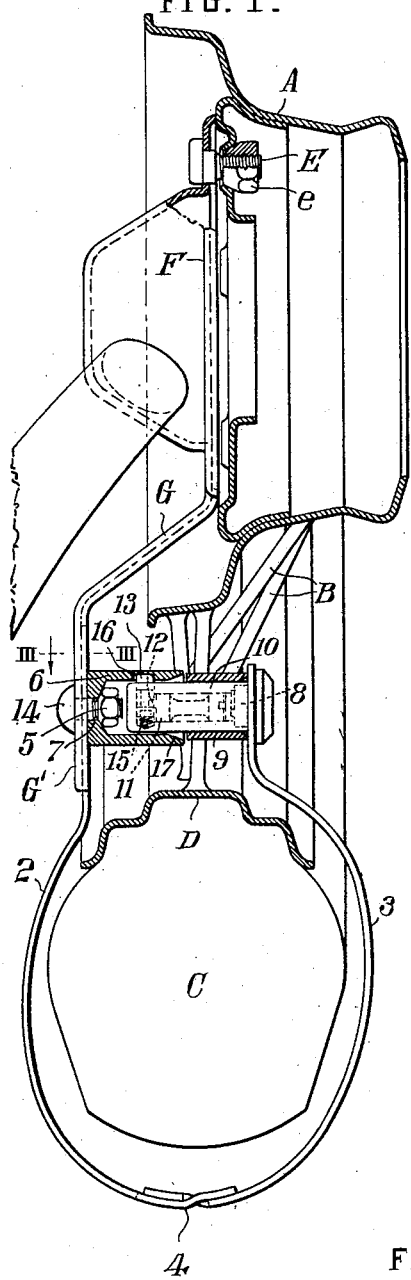
Figure 1 is a vertical sectional view illustrating a spare wheel mounted at the rear of an automobile with the present invention employed to lock the wheel and tire against theft or unauthorized removal, a part only of the wheel being shown.

Referring to the drawing A designates the hub of a spare wheel, B the spokes thereof, C the pneumatic tire which it carries and D the rim upon which the tire is mounted. The wheel is represented as supported upon a wheel carrier F of well known construction located at the rear of an automobile, to which the wheel is secured by means of bolts E that pass through an inner flange or rim of the wheel hub in a manner well known in the art, and nuts e applied to said bolts. H designates the rear bumper of the automobile, its position only, with relation to the wheel lock, being indicated.

The wheel and tire lock consists of a band, preferably of hard, tool-resisting metal, adapted to encircle the tire and rim of the wheel when supported as a spare, the band being formed of two parts, 2 and 3, united by a hinge 4, which is preferably located directly opposite the tread portion of the tire.

Figure 3:
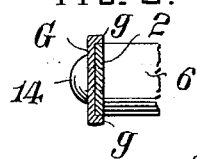
Figure 3 is a tranverse sectional view taken on the line III—III of Figure 1.

In order to provide an attachment for the inner section 2 of the band, the wheel support F has an extension G, which is preferably of channel formation, as represented in Figure 3.

This extension, as shown in the drawing, projects radially from the peripheral edge of the plate F in a rearward and downward direction so as to be inside of the wheel when supported as a spare, the outer end part, G', of the extension being disposed vertically directly to the rear of the spokes of the wheel, and lying in a plane approximating in position that including the inner edge of the wheel rim D. This arrangement renders the extension, and particularly the parts thereof to which the band is secured, difficult of access, and in this manner provides an element of safety against unauthorized tampering with the wheel lock.

The inner section 2 of the band fits closely between the flanges g of the extension G to which it is secured by a single bolt 14, screw-threaded to receive a nut 5. This bolt passes through the extension and the band section, which are perforated for this purpose, and into a socket piece 6, the base of which is also perforated, at 7, to permit the passage of the bolt. This socket piece is of such a length that, when in place, as represented in Figure 1 and secured by the bolt 14 and nut 5, its open end is located between the spokes of the wheel and in a plane which cuts the wheel rim midway or approximately so, between its front and rear edges. It will thus be seen that a single bolt and its nut serve the double purpose of securing the band section 2 to the wheel support and supporting the socket 6 in proper position to be engaged by a key-operated lock. The flanges g of the extension G prevents any twisting or turning movements of the band upon the bolt 14.

To the outer end of the other section, 3, of the band, there is secured a key-operated lock 8 which serves, in connection with the socket piece 6 already described to unite the band sections in position encircling the tire and rim. The lock is preferably mounted in a casing 9 secured to the inner face of the outer or free end of the band section 3. This casing is preferably formed of tool-resisting metal, and serves to protect the lock against attack. It is of such length that when its inner end is in engagement with the end of the socket piece 6 the outer end of the band 3 is in the desired position for locking the wheel. The lock has a sleeve or cylindrical member 10 in which is supported the turning barrel of the lock, and this member 10 is mounted within the casing 9, and extends some distance beyond the end of such casing and is of a size and shape to enter the open chamber of the socket piece 6 when the parts are brought to locking position as represented in Figure 1. Within the cylindrical member 10 of the lock there is mounted a rotatable coupling piece 11 provided at its inner end with an eccentric pin 12 which is adapted to engage with and move a plunger 13 disposed transversely of the part 10 near its inner end, the end of which plunger is adapted to enter a recess 16 in the socket piece 6. Back of the inner end of the plunger 13 is a spring 15 that tends to move it outwardly so that it enters the socket 16. The inner face of the portion of the wall of the socket piece immediately surrounding its open end is beveled as represented at 17 to facilitate the entrance of the cylindrical piece 10 into the socket, and to move the plunger, by a camming action, inwardly against its spring 15, as the parts are brought to locking position. The specific lock shown is not herein claimed, as that forms one of the novel features of another application of mine filed September 23, 1931 which bears Serial No. 564,633.

Figure 2:
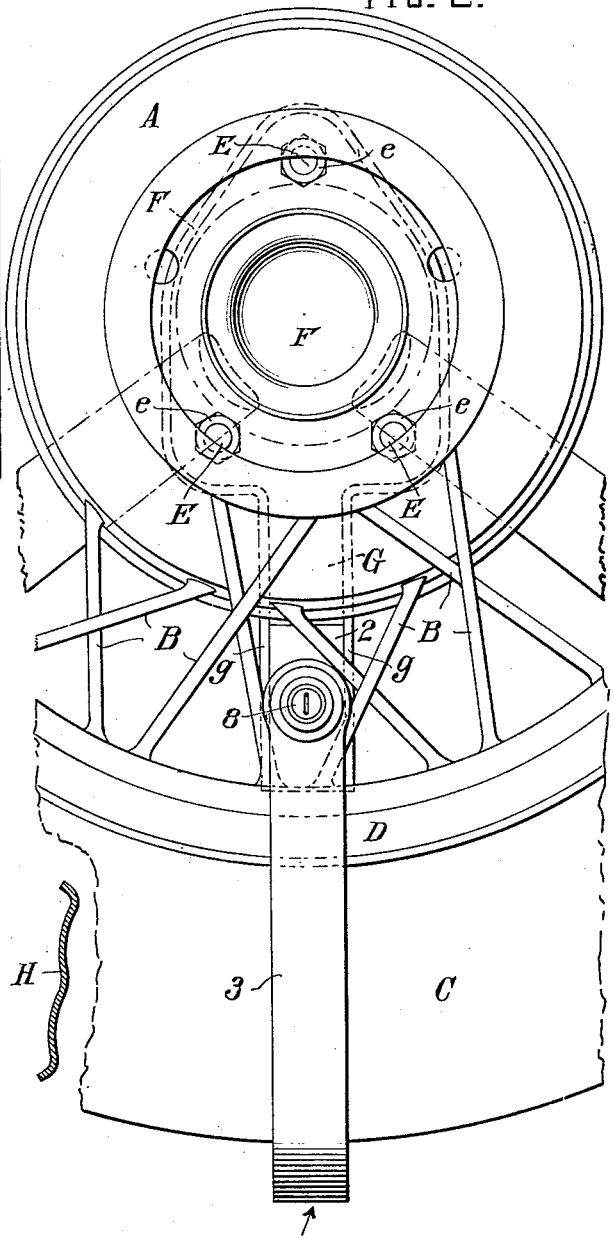
Figure 2 is a rear view of the parts shown in Figure 1.

When it is desired to release a wheel, secured by the present invention as represented in Figs. 1 and 2, the lock 8 is operated by the use of a key suited thereto to rotate the coupling piece 11 and retract the plunger 13, permitting the outer section 3 of the band to be swung into position to free the wheel and permit its removal from the support F. When the rear bumper H is located sufficiently far away from the wheel to give the necessary clearance for the passage of the tire between the bumper and the support F and extension G, the section 3 may be swung directly out and away from the socket piece 6 and the attached section 2 of the band. When, however, the bumper is located close to the wheel, as indicated in the drawing, the band section 3 cannot be moved sufficiently far away from the section 2 to give the necessary clearance for removing the tire if swung on its pivot 4 and only in the planes including the two sections 2 and 3 when in closed or locking relationship. However, the hinge 4 is so constructed that the section 3 after being freed from engagement with the socket 6 may be turned laterally, and moved inside the bumper H, so as to give the desired clearance for removal of the wheel and tire. The construction of parts whereby this last described operation can be effected is disclosed and claimed in my aforesaid application and need not be herein repeated.

The terms "downward" and "vertically" when used in this specification with reference to the extension G are employed, not as words of limitation defining the invention, but rather merely as descriptive of the embodiment of the invention when the associated parts thereof are set up in the relations illustrated in the accompanying drawing.

What I claim is:

1. The combination with a spare wheel support and carrier which comprises a central attachment plate to which the wheel may be secured at its hub, and an extension from the said wheel support and carrier, of a band for encircling the tire and rim of the wheel, a socket piece, a screw-threaded bolt and its nut serving to unite one end of the band to the extension and also the socket piece to the face of the band, the nut being located within the socket piece whereby it is housed thereby, a manually operated lock carried by the free end of the band having a portion arranged to enter the socket and engage therewith to lock together the ends of the band in position enrircling the wheel tire and rim, and the lock closing the open end of the socket and preventing access to the nut of the securing bolt.

2. The combination with a spare wheel support and carrier which comprises a central attachment plate to which the wheel may be secured at its hub, of an extension from the said wheel support and carrier inclining inward whereby its free end is located behind the wheel that may be supported as a spare, the end portion of the extension being of channel formation, a band for encircling the tire and rim of the wheel, one end of the band being shaped to closely fit the channel in the said end portion of the extension, a single attaching screw-threaded bolt and a nut therefor serving to unite the band to the attachment, and manually controlled locking means for uniting the free and the attached ends of the band in position with the band encircling the tire and wheel rim, the locking means serving also to conceal and protect the nut for the attaching bolt.

3. The combination with a spare wheel support and carrier which comprises a part to which the wheel may be attached at its hub, of a radial extension from the said parts with its end vertical and located opposite and to the rear of the spokes of the wheel when supported on the carrier as a spare, a locking band for encircling the tire and rim of a wheel supported on the carrier, and a single attaching bolt uniting one end of the band to the said extension, the ends of the extension and of the band inter-fitting to prevent twisting of the band on the said single attaching bolt.

4. The invention stated in claim 3, further characterized by the end of the extension being of channel shape and the attached end of the locking band fitting in the channel between the side flanges of the extension.

5. The invention stated in claim 3, further characterized by the band having locking parts interposed between the ends of the bands for uniting them in a tire-encircling position, the said locking parts covering and protecting the end of the said single attaching bolt.

In testimony whereof, I affix my signature.

FREDERICK W. HENKE, Jr.